Patented June 9, 1925.

1,541,243

UNITED STATES PATENT OFFICE.

HOMER BEHM, OF TULSA, OKLAHOMA, ASSIGNOR TO THE AMERICAN PATENT RIGHTS CORPORATION, OF DOVER, DELAWARE, A CORPORATION OF DELAWARE.

METHOD OF PRODUCING DECOMPOSED OIL MATERIAL.

No Drawing.   Application filed May 9, 1923.   Serial No. 637,890.

*To all whom it may concern:*

Be it known that I, HOMER BEHM, citizen of United States, residing at Tulsa and State of Oklahoma, have invented new and useful Improvements in Methods of Producing Decomposed Oil Material, of which the following is a specification.

The present invention relates to the production of a starter for fermentation of hydrocarbon oils such as kerosene, and the major ingredient used in making the composition is a hydrocarbon oil, preferably of the kind which is to be treated, for example kerosene of the same base as that which is to be treated.

In its simplest form known to me, the starter can be made as follows:

Example 1.

In a tank containing a petroleum oil, for example, kerosene, I add to each five gallons of the oil, 1 quart of slaked lime, 1 pint of ground rosin, ½ pint of a 40% solution of formaldehyde and 4 fluid ounces of strong aqua ammonia, cover the tank or receptacle containing these ingredients and allow the mixture to stand for at least 24 hours, then filter, heat up to about 110 or 120° F., and add 8 fluid ounces of oil of turpentine, preferably rectified oil of turpentine.

This example is continued from my co-pending application 575,040, of which the present case is in part a continuation.

The lime should preferably be freshly slaked and in the form of a fine dry powder. The rosin should preferably be freshly ground and should preferably be ground to a very fine powder.

These materials react with each other after being added to the oil, and produce a decomposition of the oil in which they are mixed.

In the above example, I have referred particularly to lime and rosin. Other solid alkalies capable of being pulverized and other solid acids capable of being pulverized, can to some extent replace the lime and rosin. As examples of such substitutes, I mention the joint use of powdered caustic soda and powdered boric acid, also powdered chalk or whiting and solid phosphoric acid, also lime or whiting or mixtures of either of these with caustic soda and tannic acid or dry tanning extracts, consisting largely of tannic acid or more or less dehydrated tannic acid. With each of the above pairs of alkali and acid, I preferably also use a small amount of tincture of iodine, for example 1 to 2 ounces in the quantities above stated. Iodine seems to make the decomposition of the oil more effective and it is believed that the yellow or brownish yellow color imparted by the iodine is of some value in the process. In place of tincture of iodine, in this example, an alcoholic solution of icthyol of about the same concentration can be used in approximately the same quantity.

The rosin preferably used is the darker colored variety. That commercially known as "grade G." gives very favorable results. The darker colored varieties of rosin seem to give better results than the light colored varieties.

In place of rosin, also other acid resins, e. g., shellac, (e. g., the darker colored varieties) can be used. Some alcohol can be added to these, to increase the solubility, if desired.

A more complete and more advisable formula which may be used for preparing the starter is as follows:

Example 2.

400 gallons of commercial kerosene is placed in a tank and to this is added 20 gallons of dry slaked lime, 10 gallons of powdered rosin, 5 gallons of strong ammonia water of about 28% strength, 10 gallons of a 40% solution of formaldehyde. This mixture is allowed to stand in a tank for 24 hours, covered but not air tight. In a separate glass vessel is mixed 12 gallons of denatured alcohol, 6 gallons of acetone and 3 gallons of tincture of iodine. To this mixture is added 5 gallons of slaked lime and 2.5 gallons of powdered rosin and 5 gallons of ground orange peel in fresh condition. This mixture is placed in a tank and allowed to stand in a dark place for 24 hours.

This second mixture, (from the alcohol, acetone, tincture of iodine, rosin, slaked lime, and orange peel) is then poured into the first mixture (from the kerosene, slaked lime, rosin, ammonia, and formaldehyde) and the mixture allowed to stand for 24 hours, in a vessel that is covered but not air tight and preferably in the dark. 6 gallons of dry chlorinated lime (bleaching powder) can then be added to the mixture and the mixture again allowed to stand for 24 hours in a vessel which is covered, but not air tight and preferably in the dark. The entire mixture is then filtered, for example, through filter paper, and is heated very slowly to a temperature between 90° F., and 120° F. The heating should be conducted very slowly and may require 2 to 3 hours. The temperature should preferably be caused to rise slowly and continuously, during the heating step.

In the winter time it is found that heating to about 90° F., will be sufficient while in the summer time it is advisable to heat somewhat further, say to 110 to 120°. These temperatures can however be varied more or less.

After this there are added 3 gallons of turpentine, preferably rectified oil of turpentine.

This material can then be preserved for any length of time in closed vessels, preferably in the dark. It is found that the material will keep in the dark apparently indefinitely, but it should not be exposed to temperatures higher than that used in the heating operation, and should be sealed up air tight and should be kept in the dark or in vessels which are opaque, such as iron vessels. In this example considerable variations in the materials used, can be made as given above.

The chlorinated lime can be omitted, if desired, but is preferably added. In place of the turpentine in this and the first example, other similar oils can be used, such as oil of pine needles, pine oil, cedar oil, or mixtures of these materials with each other or with turpentine.

The orange peel used in this example is preferably thick orange peel, run through a food chopper or similar device. In place of the orange peel can be used lemon peel, sassafras oil, lemon oil, or other highly volatile essential oils. In place of acetone other aliphatic liquids containing alkyl groups and containing oxygen can be used, which are miscible with alcohol and oil, for example, ethyl acetate or ethyl nitrate or mixtures of these. The turpentine or equivalent in both examples exercises the function of producing a complete blend of mixtures of the alcohol and some of the reaction products of the alkali and acetate, with the oil as well as serving to blend the formaldehyde and ammonia, or reaction products of these with the oil. The property of turpentine and similar oils to carry oxygen to substances with which it is mixed, is believed to be of substantial importance, in this mixture.

In place of slaked lime other alkalies can be used, such as caustic soda, mixtures of slaked lime and soda, and in case relatively strong acids being used calcium carbonate can be used to replace all or a part of the lime. I prefer slaked lime as the alkali and rosin as the acid, in all cases, these giving better results than any of the other combinations.

The second complete example above given is largely continued from my copending application 611,663, filed January 9, 1923, of which the present case is in part a continuation, and in which application I have claimed mixtures such as hereinabove described.

In both of the above examples there may also be added a small amount of tincture of iodine, for example 0.1 to 0.4 per cent. Such addition seems to materially assist the reactions in many cases. This addition is especially useful when the rosin is not used.

By the processes above described, I am enabled to produce a considerable degree of decomposition of the kerosene or other petroleum oil used and this is demonstrated by the fact that the initial boiling point and end boiling point of the product are both considerably lower than with the original oil used.

In place of the kerosene above referred to, I can use other petroleum oil material particularly heavy naphtha, distillates less volatile than kerosene, such as are used for mineral seal oil substitutes and boiling at higher temperatures than kerosene. In general in petroleum oil distillates boiling above 250° F., can be used. These distillates are preferably carefully refined before use in my process, by being subjected to the ordinary refining processes until they are water white or substantially so. The oil used can be either paraffin base oil, asphaltic base oil, or semi-asphaltic base oil, or any petroleum oil, or mixtures thereof.

The products can be used for an energizer to be added to gasoline, whereby the resulting product is highly suitable for use in automobile motors, giving greater mileage, greater ease of starting and preventing formation of carbon in the cylinders of the engine. Gasoline or other automobile engine fuel treated with this energizer also has been found to be capable of removing deposited carbon from the motor. It is believed that these advantageous properties are due to the available oxygen content of the energizer added.

These products can also be used as a starter for fermentation processes involving the fermentation of mineral oil materials such as kerosene, naphtha, gas oil, fuel oil, or even crude petroleum itself. The preferred mode of carrying out the fermentation is described in detail in my co-pending application 575,040 of which the present case is in part a continuation.

In the above examples, instead of formaldehyde, other aldehydes can be used, such as acetic aldehyde, or polymers of aldehydes.

The above examples are given for the purpose of illustration only. It is to be understood that various other additions can be made without departing from the spirit of my invention.

In the above description I have referred in several places to filtering the oils after the solid and liquid materials therein have been allowed to react for a period of 24 hours or more. The by-product of this filtration operation or the sludge has been found to be a useful material for producing additional quantities of decomposed oil or ferment material or starter for fermentation. This sludge can be mixed with a small or a large volume of oil, for example, it can be mixed with one or two times its bulk of ordinary kerosene, (or greater or smaller quantities of kerosene can of course be used) and the mixture can then be allowed to stand at ordinary room temperature or at higher or lower temperatures, for a period of several weeks or several months, during which time a search of progressive decomposition of the whole mass takes place, and after standing for sometime, there will remain a relatively clear somewhat thick or syrupy liquid, of somewhat yellowish brown color, supernatent upon the solid residue or mud of the decomposition products of the lime and rosin and other materials used. This liquid material can then be drawn off and can then be added to the decomposed oil above referred to, after straining or filtering through a cloth or other filtering device. Such addition of this relatively dark colored liquid material and the decomposed oil is thought to be particularly useful, when the decomposed oil is to be used for a starter for fermentation as described, in my application 575,040.

I claim:

1. A process of making a decomposed oil which comprises reacting upon a solid acid material in a finely divided state, with an alkali material, while both are in a hydrocarbon oil being treated, adding ammonia and an aldehyde material, allowing to stand for at least several hours for the reaction to go on, and blending the product with a terpene oil.

2. A process of making a decomposed oil which comprises reacting upon a solid acid material in a finely divided state, with an alkali material, while both are in a hydrocarbon oil being treated, adding ammonia and an aldehyde material, allowing to stand for at least several hours for the reaction to go on, mixing in a separate receptacle from the above, alcohol an alkyl compound containing oxygen which can blend with alcohol and with petroleum oils, and an iodin-containing material and adding the mixture to the above, and blending the product with a terpene oil.

3. A process of making a decomposed oil which comprises reacting upon a solid acid material in a finely divided state with an alkali material, while both are in a hydrocarbon oil being treated, adding ammonia and an aldehyde material, allowing to stand for at least several hours for the reaction to go on, mixing separately from the above, alcohol, acetone, tincture of iodin, orange peel, slaked lime, and rosin, allowing to stand, adding to the above mixture, and blending the product with a terpene oil.

4. A process of making a decomposed oil which comprises reacting upon a solid acid material in a finely divided state with an alkali material, while both are in a hydrocarbon oil being treated, adding ammonia and an aldehyde material, allowing to stand for at least several hours for the reaction to go on, mixing in a separate receptacle from the above, alcohol an alkyl compound containing oxygen which can blend with alcohol and with petroleum oils, and an iodin-containing material and adding the mixture to the above, adding a hypochlorite compound.

5. A process of making a decomposed oil which comprises reacting upon a solid acid material in a finely divided state, with an alkali material, while both are in a hydrocarbon oil being treated, adding ammonia and an aldehyde material, allowing to stand for at least several hours for the reaction to go on, mixing separately from the above, alcohol, acetone, tincture of iodin, orange peel, slaked lime, and rosin, allowing to stand, adding to the above mixture, adding bleaching powder, filtering, heating to between the approximate limits of 90 and 120° F., filtering, and blending the product with a terpene oil.

6. A process of producing a decomposition of petroleum oil material, which comprises reacting in the said oil, between rosin, slaked lime, an aldehyde and ammonia, and adding a terpene oil capable of serving as a blending agent, such latter agent being added when the mixture is at a temperature of about 90 to 120° F.

7. A process of making a decomposed hydrocarbon oil which comprises mixing with 400 volumes of oil, 20 volumes of slaked lime, 10 volumes of powdered rosin, 5 volumes of strong ammonia water, 10 volumes of 40% formaldehyde solution and allowing the mixture to stand for 24 hours; separately mixing together 12 volumes of denatured alcohol, 6 volumes of acetone, 3 volumes of tincture of iodin, 5 volumes of slaked lime and 2.5 volumes of powdered rosin and 5 volumes of ground orange peel and allowing this mixture to stand for 24 hours, then mixing the two materials together allowing to stand for 24 hours, adding 6 volumes of chlorinated lime, again allowing to stand for 24 hours, separating insoluble matter from the liquid, heating slowly to a temperature between 90 and 120° F., and adding 3 volumes of turpentine.

8. A process of making a decomposed oil material which comprises mixing a large volume of mineral oil material with substantially small quantities of slaked lime, rosin, ammonia water, formaldehyde solution, allowing to stand for 24 hours; separately mixing denatured alcohol, acetone and tincture of iodine with slaked lime and rosin and orange peel, allowing to stand for 24 hours, then mixing the two liquids together, allowing to stand again for 24 hours, then adding chlorinated lime and allowing to stand for 24 hours, then filtering, heating slowly to between 90 and 120° F., and adding turpentine.

In testimony whereof I affix my signature.

HOMER BEHM.